United States Patent
Li et al.

(10) Patent No.: US 10,152,247 B2
(45) Date of Patent: Dec. 11, 2018

(54) ATOMICALLY COMMITTING WRITE REQUESTS

(71) Applicant: Hewlett Packard Enterprise Development LP, Houston, TX (US)

(72) Inventors: Sheng Li, Palo Alto, CA (US); Jishen Zhao, San Jose, CA (US); Jichuan Chang, Sunnyvale, CA (US); Parthasarathy Ranganathan, San Jose, CA (US); Alistair Veitch, Mountain View, CA (US); Kevin T. Lim, La Honda, CA (US); Mark Lillibridge, Mountain View, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 114 days.

(21) Appl. No.: 15/113,824

(22) PCT Filed: Jan. 23, 2014

(86) PCT No.: PCT/US2014/012742
§ 371 (c)(1),
(2) Date: Jul. 23, 2016

(87) PCT Pub. No.: WO2015/112148
PCT Pub. Date: Jul. 30, 2015

(65) Prior Publication Data
US 2016/0342351 A1    Nov. 24, 2016

(51) Int. Cl.
*G06F 3/06*    (2006.01)
*G06F 11/14*   (2006.01)
*G11B 27/36*   (2006.01)

(52) U.S. Cl.
CPC .......... *G06F 3/0619* (2013.01); *G06F 3/0658* (2013.01); *G06F 3/0659* (2013.01);
(Continued)

(58) Field of Classification Search
CPC .... G06F 3/0619; G06F 3/0658; G06F 3/0659; G06F 3/0679; G06F 11/1471; G06F 11/1474; G06F 27/36; G06F 2201/805
See application file for complete search history.

(56) References Cited

U.S. PATENT DOCUMENTS

| 5,369,757 A | 11/1994 | Sprio et al. |
| 6,981,004 B2 | 12/2005 | Ganesh et al. |

(Continued)

FOREIGN PATENT DOCUMENTS

EP    1349066    10/2003

OTHER PUBLICATIONS

Doudalis, I. et al., Euripus: A Flexible Unified Hardware Memory Checkpointing Accelerator for Bidirectional-Debugging and Reliability, (Research Paper), Jun. 2012, 12 Pgs.

(Continued)

*Primary Examiner* — Hiep T Nguyen
(74) *Attorney, Agent, or Firm* — Hewlett Packard Enterprise Patent Department (57) ABSTRACT

A technique includes acquiring a plurality of write requests from at least one memory controller and logging information associated with the plurality of write requests in persistent storage. The technique includes applying the plurality of write requests atomically as a group to persistent storage.

18 Claims, 4 Drawing Sheets

(52) U.S. Cl.
CPC ........ *G06F 3/0679* (2013.01); *G06F 11/1471* (2013.01); *G06F 11/1474* (2013.01); *G06F 2201/805* (2013.01); *G11B 27/36* (2013.01)

(56) References Cited

U.S. PATENT DOCUMENTS

| | | | |
|---|---|---|---|
| 9,170,938 B1* | 10/2015 | Walsh | G06F 12/0246 |
| 2003/0005354 A1 | 1/2003 | Kalman | |
| 2004/0221116 A1 | 11/2004 | Hu et al. | |
| 2005/0071336 A1 | 3/2005 | Najork et al. | |
| 2006/0253502 A1 | 11/2006 | Raman et al. | |
| 2007/0162692 A1 | 7/2007 | Nishimoto et al. | |
| 2008/0140733 A1 | 6/2008 | Chan et al. | |
| 2012/0030408 A1 | 2/2012 | Flynn et al. | |
| 2012/0221768 A1* | 8/2012 | Bagal | G06F 12/0811 711/103 |
| 2015/0261805 A1* | 9/2015 | Lee | G06F 17/30353 707/703 |
| 2016/0070771 A1* | 3/2016 | Vermeulen | G06F 17/30575 707/687 |
| 2017/0160933 A1* | 6/2017 | De Jong | G06F 3/061 |

OTHER PUBLICATIONS

International Searching Authority, The International Search Report and the Written Opinion, dated Sep. 25, 2015, 12 Pages.

\* cited by examiner

ATOMICALLY COMMITTING WRITE REQUESTS

BACKGROUND

A computer system has traditionally contained both volatile and non-volatile storage devices. In this manner, due to their relatively faster access times, volatile memory devices, such as dynamic random access memory (DRAM) devices, have traditionally been used to form the working memory for the computer system. To preserve computer system data when the system is powered off, data has traditionally been stored in non-volatile mass storage devices associated with slower access times, such as magnetic media-based or optical media-based mass storage devices.

The development of relatively high density, solid state non-volatile memory technologies is closing the gap between the two technologies, and as such, non-volatile memory devices are becoming increasingly used to form a working, persistent memory for both traditional "memory" and "storage" functions.

DETAILED DESCRIPTION

A computer system may contain a working, persistent memory that is formed from non-volatile memory (NVM) devices, such as flash memory devices, memristors, phase change memory devices, spin-torque transfer random access memory (STT-RAM) devices, and so forth. Memory accesses at the byte granularity using the NVM devices along with dynamic random access memory (DRAM)-like latencies allow fine-grain and efficient persistence of data through execution of regular central processing unit (CPU) store instructions. However, data that is generated by the execution of CPU store instructions may not be immediately stored in the persistent memory. In this manner, due to such factors as caches and the presence of faults in the computing environment, challenges exist in ensuring that persistent data is consistent. In this context, ensuring that persistent data is in a "consistent state," requires that all program invariants are met. Without a mechanism to enforce program invariants, a hardware or software failure may render persistent data incorrect and hence, unusable to applications.

Therefore, updates, or stores (or "writes") to persistent memory may be tracked, or logged, for purpose of ensuring that the data that is stored in the persistent memory is consistent. More specifically, logging is a technique that may be used to preserve the integrity of application data in the face of sudden system crashes due to power outages, kernel panics, and so forth. One type of log is an undo log, which stores "old" data values so that changes may be rolled back to a particular point of time. Another type of log is a redo log, which allows a given set of transactions to be replayed forward for purposes of restoring the system to a particular state and time.

Figure 1:
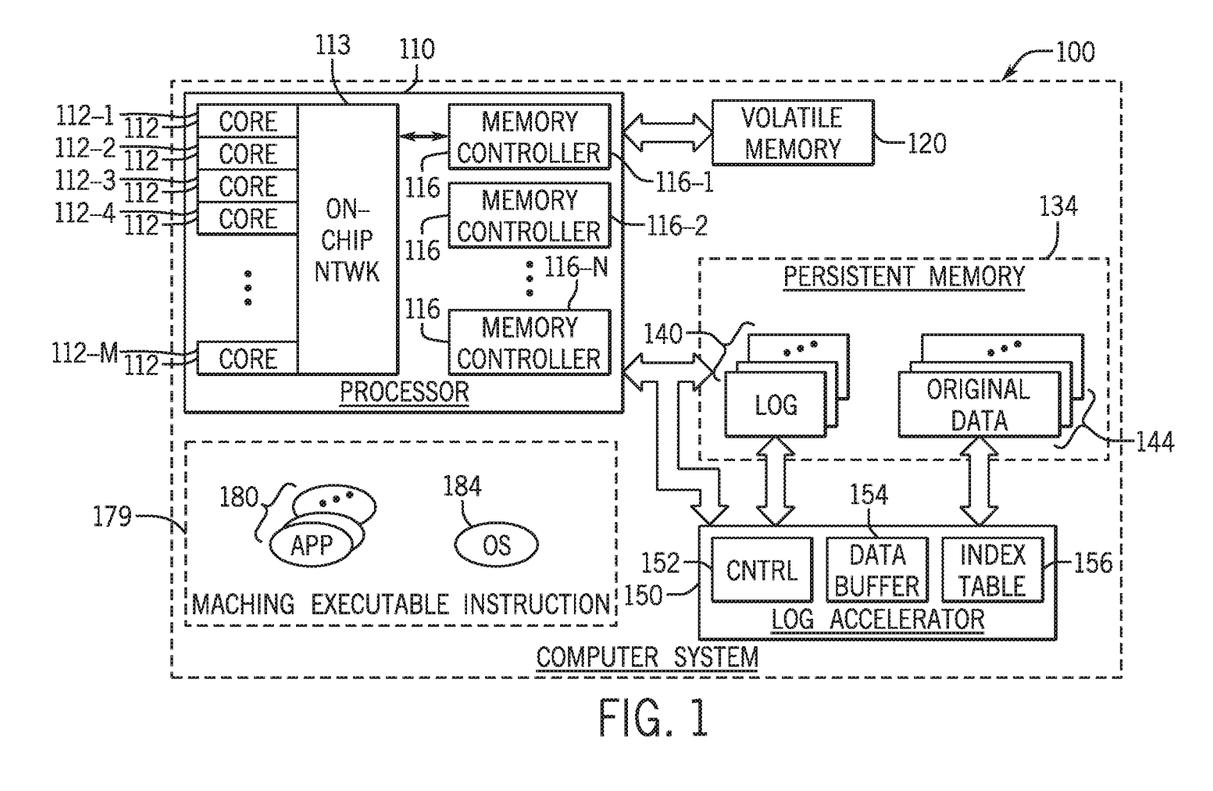
FIG. 1 is a schematic diagram of a computer system that contains a persistent memory according to an example implementation.

Referring to FIG. 1, in accordance with example implementations, a computer system 100 includes a persistent memory 134 and includes a persistent memory space-based log accelerator 150 for purposes of managing redo and/or undo logs of the computer system 100, as described herein. The undo and/or redo logs are generally represented by reference numeral "140" in FIG. 1 and are stored in the persistent memory 134. In general, as disclosed herein, the log accelerator 150 manages logging of information associated with write requests and manages atomically committing the write requests to persistent storage in a manner that is generally transparent to the execution of machine executable instructions 179 (otherwise called "software" or "program code") by a processor 110 of the computer system 100.

In general, the computer system 100 is a physical machine that is formed from actual hardware and actual machine executable instructions, or "software." In this regard, the computer system 100 includes such hardware as non-volatile dual inline memory modules (DIMMs) that form the persistent memory 134; one or more volatile DIMMs that form a volatile memory 120 and the processor 110. In general, the processor 110 may be formed from one or multiple processing cores (M processing cores 112-1, 112-2, 112-3, 112-4 . . . 112-M, being depicted in FIG. 1 as examples). The processing core(s) 112 communicate via an onchip network 113 with one or multiple memory controllers 116 (N memory controllers 116-1, 116-2, . . . 116-N, being depicted as examples in FIG. 1) for purposes of communicating requests to store and retrieve data to/from the volatile memory 120 and persistent memory 134. Moreover, the hardware of the computer system 100 may also include the log accelerator 150, which is coupled to the memory controller(s) 116, in accordance with example implementations.

The machine executable instructions (or "software") 179 may include, as an example, sets of instructions that, when executed by the processor core(s) 112, form one or multiple applications 180 and an operating system 184. Due to the presence of the log accelerator 150, the application(s) 180 do not contain specific logging instructions within the program code for purposes of logging memory transactions.

It is noted that the computer system 100 that is illustrated in FIG. 1 is merely an example, as the computer system 100 may include various other/different machine executable instructions and hardware, in accordance with further example implementations.

The following example program (called the "pre-TxA Program") illustrates an operation—moving money between accounts—that is intended to be transactional:

```
Example pre-TxA Program move_money(int *from, int *to, int amount) {
    int old_from, old_to;   // local variables not in persistent storage
    // begin transaction
        old_from = *from;              // read from persistent storage
        old_to   = *to;                // read from persistent storage
        *from = old_from - amount;     // write to persistent storage
        *to   = old_to   + amount;     // write to persistent storage
        flush(from);
        flush(to);
    // end transaction
}
```

Here, concurrency control instructions (e.g., locking instructions) have been omitted, and it is assumed that the transaction never aborts or fails unless power is lost (e.g., in practice, a check for insufficient funds would be included). Although this program code produces durable results (note especially the flush instructions to ensure that the writes are evicted from any volatile caches to persistent memory), it is not transactional: if a crash occurs just after the store to the "from" location, money will have been removed from the "from" location but not added to the "to" location.

A solution to the above-described transactional problem is to add software logging instructions. The following example program (called the "TxA-undo Program" and which performs a durable transaction) illustrates a software-based logging solution based on undo logging:

```
Example TxA--Undo Program move_money(int *from, int *to, int amount) {
    int old_from, old_to;   // local variables not in persistent storage
    // begin transaction
        old_from = *from;              // read from persistent storage
        old_to   = *to;                // read from persistent storage
        log(from, old_from);
        *from = old_from - amount;     // write to persistent storage
        flush(from);
        log(to,   old_to);
        *to   = old_to   + amount;     // write to persistent storage
        flush(to);
        log_commit( );
    // end transaction
}
```

With undo logging, each original write of a program (say *addr=new_data) is preceded with code that creates a corresponding undo log record: an old value, old_data, is read from addr if not already done and then a tuple of the address and the read old data (<addr, old_data>) is put in the undo log, which is stored in non-volatile memory. That is, *addr=new_data is preceded by log(addr, *addr), which appends <addr, current contents of addr> to the undo log. This log record provides sufficient information to undo the write that follows its creation.

Because the software does not control cache dirty line evictions (which may be transparently handled by a hardware cache replacement mechanism), the program waits until the log write (e.g., the one or more writes required to save the log record to the log as distinguished from the original program write) completes before proceeding to the next operation. That is, log(–) contains one or more flush(–) instructions.

The transaction ends with appending and flushing a commit log record to the log file via the log_commit( ) call. At this point, the transaction has committed and will no longer be undone by recovery code. If the system crashes before the commit log record reaches persistent memory, on reboot, the undo log records for the uncommitted transaction will be used to undo the writes of the incomplete transaction. Thus, in this case it is if the incomplete transaction never occurred at all. Once a transaction has committed, its associated log records are no longer needed and can be recycled and reused for a future transaction.

The following example program (called the "TxA-redo Program" and which performs a durable transaction) illustrates a software-based logging solution based on redo logging:

```
Example TxA--Redo Program move_money(int *from, int *to, int amount) {
    int old_from, old_to;   // local variables not in persistent storage
    // begin transaction
        old_from = *from;              // read from persistent storage
        old_to   = *to;                // read from persistent storage
        int new_from = old_from - amount;
        log(from, new_from);
        int new_to   = old_to   - amount;
        log(to, new_to);
        commit( );
    // end transaction
}
```

This example differs from the previous one because instead of writing to persistent memory for purposes of logging after each write instruction (relying on recovery to undo the writes if needed), the writes are made to persistent memory only after committing. Before committing occurs, writes are only made to local variables so that the changes do not become visible in the event of a crash. The log records record each desired write to persistent memory.

The commit( ) procedure first writes then flushes a commit log record to the log then applies each of the log writes of the current transaction in order; that is, it writes new_from to *from then new_to to *to in this case. The commit( ) procedure also ensures that the log writes are flushed to persistent memory. Once each of the desired writes has been written and flushed, the commit( ) procedure marks the transaction as complete in the log. This may involve writing an additional done log record or setting a bit in the existing commit log record. This last step tells the recovery procedure that it no longer needs to (re)play the writes associated with this transaction after a crash. If the system crashes during the commit( ) procedure after the log record has been appended to the log in persistent memory, the recovery procedure effectively restarts the commit( ) procedure after the write commit log record step to ensure that all the desired writes are performed in the desired order at least once.

The undo and redo logs provide atomicity and durability support for persistent data structures. The consistency (ordering, for example) is enforced by software primitives, for example, by flushes and memory fences. The software also ensures isolation by, for example, adopting concurrency control mechanisms, such as mutexes, semaphores, transactional memory, and lock-free or wait-free data structures and algorithms.

In accordance with example implementations that are disclosed herein, the log accelerator 150 offloads logging-related tasks that may otherwise be performed by the processor 110 executing software instructions. These logging-related tasks may be tasks related to undo logging and/or redo logging, depending on the particular implementation (e.g., the calls to log(–)). In general, the log accelerator 150 identifies certain write requests, logs information for the identified write requests, and atomically applies the write requests to persistent storage, all in a manner that is generally transparent to the processor 110. Thus, unlike the examples of redo and undo logging that are set forth above, the processor 110, in general, does not execute explicit software instructions to direct the tasks pertaining to the logging. The processor 110 may execute explicit software instructions to notify the log accelerator that the transaction is ready to commit.

In accordance with example implementations, the log accelerator 150 identifies a given group of write requests as being associated with an associated atomic group, or unit, and atomically commits the write requests as a unit to persistent storage. Depending on the particular implementation, the group of write requests that form a given atomic unit may be identified by an associated memory region shared in common with the write requests; or in accordance with further example implementations, the log accelerator may identify the group of write requests by the write requests between executions of a software-based commit instruction or other instruction(s) that identify the group, as just a few examples.

The following examples set forth specific examples for undo logging, although it is understood that the log accelerator 150 may use other types of logging, in accordance with further example implementations.

For undo logging, the software programs executing on the computer system, in accordance with example implementations that are described herein, do not contain undo logging instructions other than possibly commit instructions; and in general, original data 144 and the undo log 140 are stored in the persistent memory 134.

For the following example implementation, the log accelerator 150, in general, is configured to observe write requests to a given memory region and associate these write requests with a given atomic unit, such that those memory updates to the memory region are to be logged persistently. With this configuration, the log accelerator 150 observes the corresponding memory requests, which originate with the execution of machine executable instructions by the processor 110.

The log accelerator 150 may either passively or actively observe the memory requests from the processor 110, depending on the particular implementation. In the passive approach, the log accelerator 150 intercepts memory requests that are issued by the memory controller(s) 116. In the active approach, the log accelerator 150 may probe request queue(s) of the memory controller(s) 116.

Figure 2:
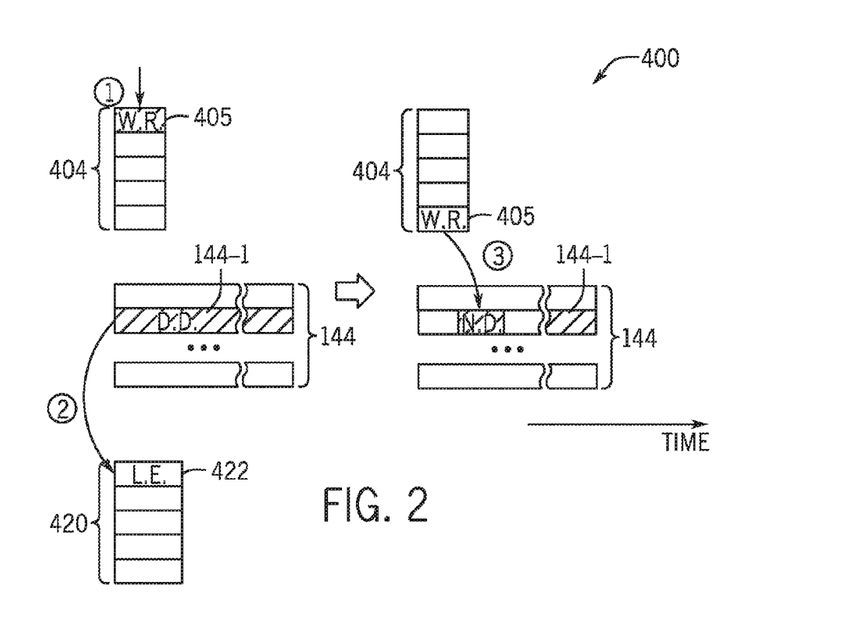
FIG. 2 illustrates an undo logging mechanism according to an example implementation.

Regardless of the particular approach that the log accelerator 150 uses to observe the memory requests, after the log accelerator 150 observes that a new write request that is associated with a given atomic unit is issued, the log accelerator 150 copies the corresponding original data values associated with the request to the undo log. Thus, as depicted in an example transparent undo log mechanism 400 of FIG. 2, a new write request 405 enters a memory controller write request queue 404 (as depicted in left side of FIG. 2). Upon observing the write request 405, the log accelerator 150 saves the original data 144-1 currently located at the address targeted by the write request 405 by copying this data and the targeted address to a corresponding log entry 422 of an associated undo log 420.

Despite its higher complexity than the passive implementation, it is noted that the active implementation may provide better parallelism and performance by creating undo logs before the memory accesses reach the memory side.

After the copying of the original data 144-1 to the undo log 420, for this example, the original write request 405 proceeds (as depicted in right side of FIG. 2), resulting in new data being stored in place of the original data 144-1. The memory write request thus overwrites the original data.

As noted above, these undo log operations are transparent to the execution of software on the computer system 100, and the software performs regular in-place updates to the original data.

The following example program (called the "TxA Program") illustrates the lack of logging instructions due to the use of the log accelerator 150:

---
Example TxA Program
---

```
move_money(int *from, int *to, int amount) {
    int old_from, old_to;   // local variables not in persistent storage
    // begin transaction
        old_from = *from;                    // read from persistent storage
        old_to   = *to;                      // read from persistent storage
        *from = old_from − amount;           // write to persistent storage
        *to   = old_to   + amount;           // write to persistent storage
        flush(from);
        flush(to);
        request_commit( );
    // end transaction
}
```

The only extra instructions over the original pre-TxA program are the signal to commit (request_commit( )) at the end. The commit signal may leverage the existing TX_END instruction in existing processors (e.g., the Intel Haswell processor), in accordance with example implementations.

Figure 3A:
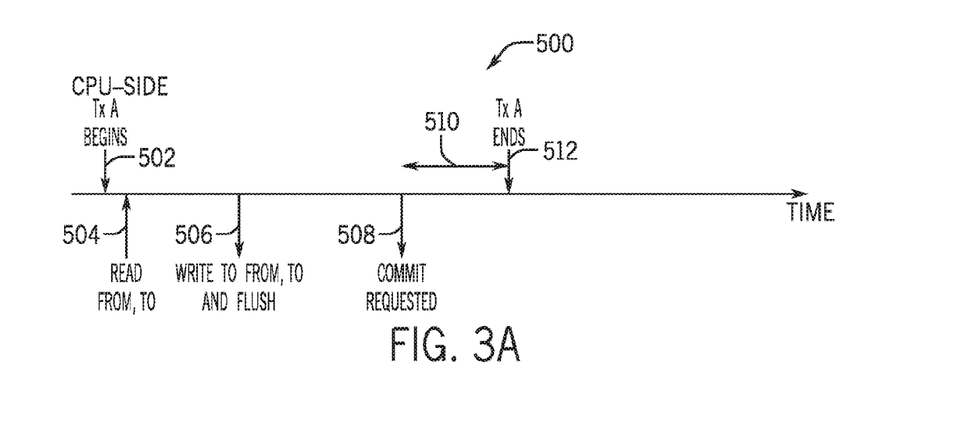
FIG. 3A illustrates a timeline from the central processing unit (CPU) side of undo logging according to an example implementation.

FIG. 3A represents a timeline 500 for the undo logging and execution of the TxA program with the now transparent undo logging being performed by the log accelerator 150. Referring to FIG. 3A in conjunction with FIG. 1, for this example, execution of the TxA program begins (502), and then the values at "from" and "to" are read, as indicated at reference numeral 504. The new values of "from" and "to" are next written then flushed, as indicated at reference numeral 506, without explicit logging being seen from the processor side. Next, a commit is requested (508). This may involve the processor 110 signaling the log accelerator 150 and then waiting (period 510) until the log accelerator 150 acknowledges that the commit has been performed. This signaling & acknowledging might be performed by the processor 110 writing to (and flushing to) a specially designated memory location, with the log accelerator delaying acceptance of the write until the commit is done. Finally, the TxA program ends, as indicated at reference numeral 512.

Figure 3B:
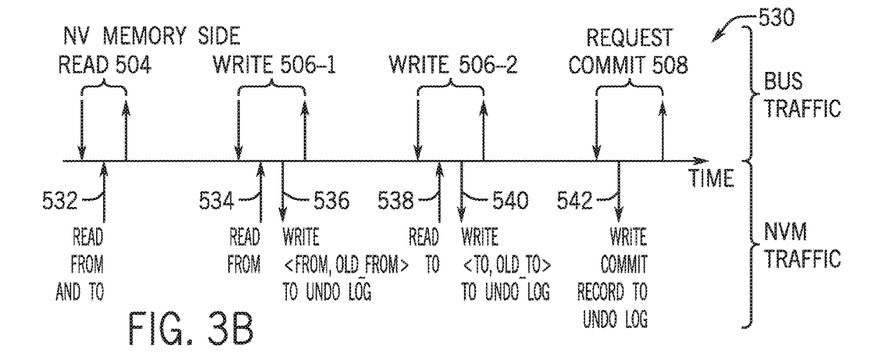
FIG. 3B is a timeline of undo logging from the non-volatile memory side according to an example implementation.

The non-volatile memory side that occurs in connection with the transparent logging of the TxA program is illustrated in an example timeline 530 of FIG. 3B. Above the horizontal line of FIG. 3B is shown the bus traffic from the processor and below the line is shown the writes and reads to the non-volatile memory (the persistent memory 134 of FIG. 1). Referring to FIG. 3A in conjunction with FIG. 1, in the timeline, the read requests 504 are first received and serviced by reading from the non-volatile memory (532). Next, one of the write requests 506 is received. It is assumed in this example that the write request 506-1 for "from" is received first (which of "from" or "to" is received first depends on what order the processor evicts them from its caches). The log accelerator 150 handles this write request by first reading the old value of "from" (534) then saving this old value along with the address of "from" in the undo log (536). Once the non-volatile memory acknowledges the write 536, the log accelerator 150 acknowledges the write request 506-1. This writing to the undo log is not visible from the processor's perspective, as the processor 110 perceives only that it is performing a write.

The handling of the write request to "to" (506-2) is handled similarly by first reading the old value of "to" (538) and then writing (540) the address (to) and the old value of "to" to the undo log. Finally, the request commit request 508 is received. In response, the log accelerator writes 542 a commit log record to the undo log. Once the log record has been persisted, the log accelerator acknowledges the request commit request 508 and the transaction ends.

The log accelerator 150 atomically commits a given group of write requests to persistent storage in response to receiving a commit signal; and as mentioned above, this signaling may be accomplished in many different ways, such as by an explicit commit instruction executed by the processor, an implicit signal formed by the processor 110 writing to a region of memory not associated with the current atomic unit, and so forth.

Figure 4A:
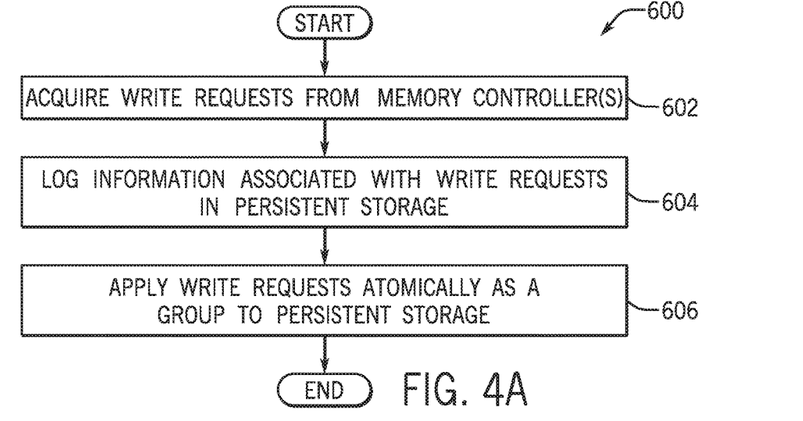
FIG. 4A is a flow diagram depicting a technique to commit logged write requests to persistent storage according to an example implementation.

To summarize, referring to FIG. 4A in conjunction with FIG. 1, in accordance with example implementations, the log accelerator 150 may perform a technique. Pursuant to the technique 600, the log accelerator 150 acquires write requests (via probing a memory controller queue or via the memory controlling providing the request, as examples) from one or multiple memory controllers, pursuant to block 602. The log accelerator 150 logs information that is associated with the write requests in persistent storage, pursuant to block 604; and in response to receiving a commit signal, the log accelerator 150 atomically applies the write requests as a unit, or group, to persistent storage, pursuant to block 606. The information associated with the write requests may include the address being written to, the old contents of that address, and the new data that is to be written to that address. The write requests may be atomically applied as a unit when undo logging is being used by simply writing a log commit record to the undo log. This is atomic because if a crash occurs before the commit log record is persisted, recovery automatically rolls back the transaction using the saved undo log records.

Figure 4B:
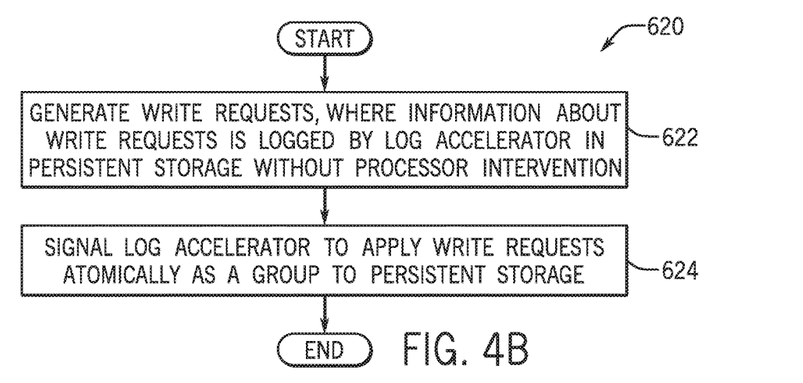
FIG. 4B is a flow diagram depicting a processor-side technique to use a log accelerator according to an example implementation.

From the processor side, a technique 620 that is depicted in FIG. 4B may take advantage of the "transparent" logging by the log accelerator 150. Pursuant to the technique 620, the processor 110 generates (block 622) write requests (associated with a given atomic unit), where information about the write requests is logged by the log accelerator 150 in persistent storage without processor intervention. The log accelerator 150 may then be signaled (block 624) to apply the write requests atomically as a group to persistent storage, pursuant to block 624.

Although for simplicity, the above examples describe a case where only one transaction is in flight at a time, multiple transactions occurring at once may be supported. By associating each with a different given atomic unit, the writes of each transaction can be distinguished. Commit requests will also need to be associated with a particular current transaction. Committing or aborting one transaction does not affect the log records belonging to a different transaction.

The case using redo logging is broadly similar to that of undo logging. When a write request is received from processor 110 associated with the given atomic unit, a redo log record is written transparently to the processor to a redo log stored in persistent memory. In this case, the redo log record may contain the address being written and the new value to be written to it. The new value is not written to persistent memory, leaving the old value at that address still in place. Instead, the new value is kept in volatile storage, where it can be read back by the processor. In some implementations, uncommitted new values may be kept in one or more of the processor's caches, with care taken to ensure that they cannot be evicted to persistent memory. In other implementations, uncommitted new values may be kept in a data buffer 154 associated with the log accelerator 150.

If the transaction is aborted, these volatile new values are discarded (e.g., via invalidating the relevant cache lines or by removing the volatile new values from the data buffer 154) and the associated redo log records discarded. If a commit is requested, a commit log record is first written and flushed to persistent memory then the new values are written into place in persistent memory using information stored in the redo log. Once all the new values associated with the transaction have been written into persistent memory, any extra volatile copies (e.g., in data buffer 154) or blocking of cache lines from being evicted may be discarded; also at this time, the associated redo log records can be discarded.

With redo logging, the commit can be acknowledged done to the processor once the commit log record has been written and flushed. It is not necessary to wait for all or even any of the new values to be written into place in persistent memory. If a crash occurs at this point, the recovery process will finish writing the new values into place. Accordingly, the new values can be written into place in the background ("background log replaying") while the processor continues working. Delaying replaying of writes can increase the size of the redo logs required because it can take longer to discard/reuse log records.

More specifically, in accordance with example implementations, the log accelerator 150 performs background log replaying in one of the following two cases: 1.) the memory bus is idle to minimize potential interference with non-log and critical memory accesses; and 2.) the allocated redo log space in the non-volatile memory is almost full. In either case, the log accelerator 150 scans the redo log(s) for committed but not yet fully replayed transactions ("finalizing transactions"); replays the associated redo log records (i.e., copies the data values from the redo log records to their destination addresses); and then the log accelerator 150 reclaims, or releases, the corresponding log records after the data copies are completed.

Figure 5:
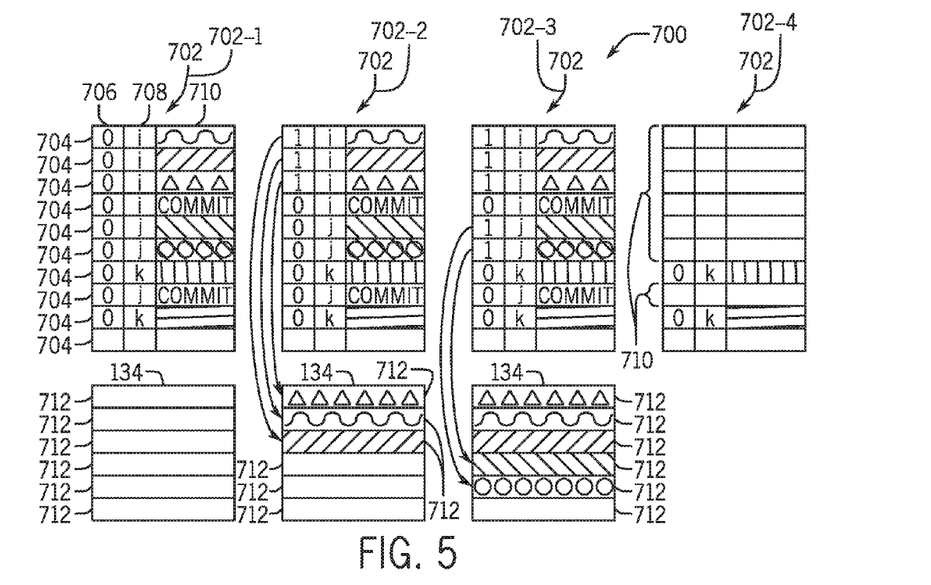
FIG. 5 illustrates a redo log management mechanism according to an example implementation.

As a more specific example, FIG. 5 depicts an example 700 for background log replaying by the log accelerator 150. This example illustrates redo log 702 containing transactions with identifications (IDs) of i, j, and k at different times that correspond to redo log instances 702-1 (the initial example redo log instance), 702-2, 702-3 and 702-4 (the last example redo log instance). The redo log 702 contains log records 704, and each log record 704 includes a transaction identifier field 708 that holds the ID of the transaction it is associated with and a replayed field 706 that holds 1 (rather than 0) if the write described by that log record has already been replayed. A transaction has committed when a commit record has been written to the log for it. Thus, for the example of FIG. 5, the transactions i and j have committed. A transaction is a finalizing one when it has committed but still contains log records that have not yet been replayed.

As such, the log accelerator 150, for this example, determines that transactions i and j are finalizing ones. It thus replays the log records belonging to those transactions that have not yet been replayed, resulting in storage of data in locations 712 of persistent memory 134. As log accelerator 150 replays a log record, it may set its associated replayed field bit. Once all of the log records associated with a finalizing transaction (except the commit record) have been replayed, that transaction has been finalized and all of its log records (including the commit log record) may be discarded or reused in atomic fashion. As a result of this replay, the log accelerator 150 may then reclaim memory space 710. The log accelerator 150 may replay writes in the order they occur in the redo log in order to handle correctly cases where multiple writes are to the same address.

Figure 6:
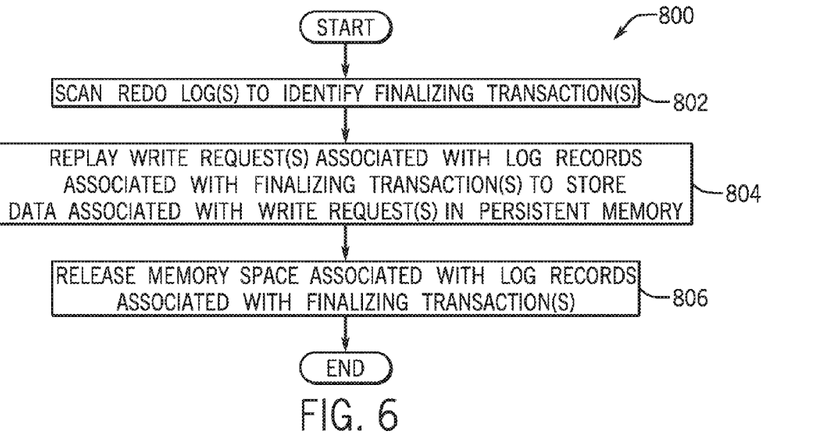
FIG. 6 is a flow diagram depicting a technique to manage background log replaying according to an example implementation.

Thus, referring to FIG. 6, in accordance with example implementations, a technique 800 that is performed by the log accelerator 150 to manage one or more redo logs includes scanning (block 802) the redo log(s) to identify finalizing transactions(s). For the finalizing transactions(s), the technique 800 includes replaying (block 804) the one or more write requests that are associated with the log records associated with the finalizing transactions(s) to store data associated with the write request(s) in persistent memory. The memory space associated with the log records associated with the finalizing transactions(s) is then released, pursuant to block 806.

Referring back to FIG. 1, in accordance with example implementations, as mentioned above, the log accelerator 150 performs the above-described background log replaying when the memory bus is idle. When this occurs, the log accelerator 150 pauses whenever a new memory request is issued by a memory controller 116 and resumes when the memory bus is once again idle. As further noted above, the log accelerator may also be constructed to perform background log replaying in the case that a threshold of the memory space allocated for log this in the non-volatile is above a certain threshold. As an example, this threshold may be eighty percent, in accordance with some example implementations, although other thresholds may be used in accordance with further implementations.

Moreover, in accordance with example implementations, the log accelerator 150 may begin performing background log replaying in response to a higher threshold and pause when the allocation decreases below a lower threshold. Additionally, in accordance with further implementations, log accelerator 150 may perform a combination of the above-described schemes to start and stop background log replaying. In this manner, in accordance with some implementations, the log accelerator 150 may employ the above-described threshold and memory bus idle determination techniques for purposes of determining when to start and stop the background log replaying. Thus, many implementations are contemplated, which are within the scope of the appended claims.

In accordance with some implementations, the threshold and starting and stopping policy are selected so that all of the logs 140 that are stored in the persistent memory 134 are examined often enough for possible log record reuse so that their size remains low so that there is no need for logs to be evicted to a backing store of disk or flash memory. In accordance with some implementations, if the log accelerator 150 does not find sufficient finalizing transactions, the accelerator 150 generates an interrupt, which is serviced by the processor 110 so that through the execution of software, the processor 110 may issue checkpointing requests to evict redo log records into the backing store.

It is noted that the background log replaying offloads overhead from the processor 110 and performs the corresponding data copying within memory without contaminating the CPU caches.

In accordance with further implementations, the log accelerator 150 may apply the redo log records to the in-place memory data and then mark the log entries ready to be recycled. Then, the processor 110, through the execution of machine executable instructions, may recycle the memory space for the log entries.

The above-described log acceleration supports memory updates of any granularity, from single words to arbitrarily large updates. A relatively large memory update of several megabytes or gigabytes may result in creating a large amount of undo log records. For purposes of accommodating relatively very large memory updates, which may potentially overflow the non-volatile memory address space, pages may be swapped into and out of the backing disk or flash.

The above-described log acceleration may also leverage the memory's local buses and row buffers for memory copies, in accordance with example implementations. By leveraging the internal memory bandwidth, the bandwidth demand at global processor-memory bus may be significantly mitigated.

Among the other details of the computer system 100, in accordance with example implementations, the persistent memory 134 may be formed from dual inline memory modules (DIMMs) that may be deployed on the processor-memory bus and mapped to a single physical address space; and data updates that use persistence support are mapped to these DIMMs.

As described herein, the logs 140 that are depicted in FIG. 1 may be redo logs and/or undo logs. The granularity of data stored in one log record of the undo log may be one cache line or smaller, for example, a word size. Each log record may be a tuple of metadata and a data value, for example: <valid, transaction ID, address, data value>. In accordance with example implementations, the undo log may be stored in a circular buffer, which allows simultaneous appends and truncations.

In accordance with example implementations, the redo log records are not discarded until the associated transaction aborts or the data updates have been written over the original data and therefore, in accordance with example implementations, the redo logs may be stored in a non-circular buffer. The granularity of the redo log records may be any size, as defined by programmers, using logging functions. Therefore, the granularity may be relatively very large (exceeding megabytes or gigabytes, in accordance with some implementations). Each log record may be a tuple of metadata and data value, for example: <durable bit, transaction ID, address, data value>. The "durable bit" represents whether the redo log record has been replayed and thus whether the data values have been copied to their destination addresses. The "transaction ID" identifies the specific atomic memory transaction to which that log record belongs.

In accordance with example implementations, the log accelerator 150 may be integrated with the non-volatile memory DIMMS of the persistent memory 134. Through the execution of machine executable instructions by the processor 110, the processor may be responsible, in accordance with example implementations, for defining memory regions or individual memory updates that are to be logged. The techniques for defining the memory regions for individual memory updates that are to be logged are discussed below.

In accordance with example implementations, the log accelerator 150 is separate from the memory controllers 116. As shown in FIG. 1, the log accelerator 150, may in accordance with example implementations, include a controller 152 (one or more central processing units (CPUs), one or more microcontrollers, and so forth, as examples), which performs the above-described log accelerator functions, including the following. When transparent undo logging is employed by the computer system 100, the log accelerator 150 observes the memory traffic from the processor 110 using either the active or passive techniques, as described above, and creates the corresponding undo logs. When redo logging is employed by the computer system 100, the log accelerator 150 monitors the memory bus and the redo log. The log accelerator 150 performs background log replaying when the memory bus is idle or the redo log is almost full (as defined by a threshold, as discussed above), in accordance with example implementations.

As a more specific example, in accordance with some implementations, as depicted in FIG. 1, the log accelerator 150 includes a data buffer 154, which may be constructed to temporarily buffer data values when copying the data between the log and original data pages. The log accelerator 150 further includes, in accordance with example implementations, an index table 156. The log accelerator 150 maintains the index table 156 to locate the starting location of the log records belonging to each transaction. If a separate log buffer for each transaction is maintained, the log accelerator 150 may maintain a relatively simple index table, with the entries identifying the head address of each log buffer. In further implementations, the log accelerator 150 may maintain a single log buffer for all transactions, and the log records of a single transaction may be stored in non-contiguous locations. For these implementations, the index table 156 stores the mappings of transaction IDs and these locations. Thus, by using the index table 156, the log accelerator 150 may relatively easily locate the log records of a specific transaction.

The log accelerator 150 may include various other features, in accordance with example implementations. For example, the log accelerator 150 may contain memory-mapped registers that allow the processor 110 to designate the memory region/accesses making up a given atomic unit or the start and the end of a transaction. The registers of the log accelerator 150 may be mapped to the volatile memory space, and through the execution of machine executable instructions, the processor 110 may access these registers using memory load/store operations. In particular, the processor 110 may specify persistence requirements by defining memory regions or persistent data objects. In this manner, in accordance with example implementations, a given register (pair) may specify a single memory region or persistent data object. The processor 110 may inform the log accelerator 150 about the beginnings and ends of memory transactions.

The log accelerator 150, for undo logs, automatically backs up data changes within a transaction to the undo log, in accordance with example implementations. With a persistent data object defined by the registers of the log accelerator 150, the log accelerator 150 may automatically backup in the undo log changes to the address space that holds that data object. In this case, the processor 110 may also request that the data is to be made durable by writing to registers, and the log accelerator 150, when maintaining the undo log, may log the latest updates (after receiving the "persistence begin" write to the memory mapped registers), which may reduce unnecessary log entries. It is noted that the processor 110, through the execution of machine executable instructions, may maintain the order of "persistence begin" signals (to the special registers) and the data updates using flush and memory fencing, in accordance with example implementations.

In accordance with example implementations, software executed by the processor 110 may interact with the log accelerator 150 to perform the following tasks. Memory regions/accesses that need to be logged are defined. Transactions may be aborted or committed. The log accelerator 150 options may be set; for example, whether to use undo or redo logging. A memory space may be allocated for an undo or redo log. A memory space may be reclaimed for an undo or redo log. Querying of undo or redo log records may be allowed.

With these base level capabilities, higher level software may allow a number of techniques to be performed to access and use persistent memory to achieve transactions. These include techniques, such as the following, in accordance with example implementations. Persistent versions may be made of any existing memory allocation functions (e.g., the C standard library malloc( ) and free( ) functions, C++ new( ), the linux kernel kmalloc( ) or any other such). Atomic update semantics may be used (e.g., transactional memory semantics as in Intel Haswell processor or POSIX msync( )) to indicate when memory updates commit and become durable. Log semantics may be used (e.g., using memory loads and stores in the atomic updates semantics or explicitly calling log functions). Communications with the log accelerator 150 may be achieved using the memory mapped registers in the log accelerator 150. Functionality may be implemented in either the operating system 184 (in its normal course, due to security implications) or inside user-level code (in an embedded system, for example).

It is noted that although a single log accelerator 150 is depicted in FIG. 1, the computer system 100 may have multiple log accelerators, in accordance with further implementations. For example, in accordance with some implementations, a particular log accelerator 150 may be dedicated for redo logging, and another log accelerator of the computer system 100 may be used for purposes of background log replaying. Thus, many implementations are contemplated, which are within the scope of the appended claims.

When a given transaction aborts, due to a system power failure or other event, the computer system 100 may retrieve the corresponding undo log and recover the original data. As examples, one of the following techniques may be used to handle the rollback.

In accordance with some implementations, the log accelerator 150 may be used to perform a hardware-based rollback. In this manner, when a transaction aborts, the processor 110 may send an abort signal to the log accelerator 150. The log accelerator 150 may be constructed to use its index table 156 to locate the corresponding log records with the corresponding transaction ID. The log accelerator 150 then copies the old data values from the log records back to their original addresses.

The computer system 100 may use a software-based rollback. In this manner, because the operating system 184 has the information of the starting address of the undo log, software mechanisms, through the execution of machine executable instructions by the processor 110, may be used to handle transaction aborts and data recovery.

In accordance with example implementations, while the original data in the main memory is recovered, the corresponding cache lines are invalidated. This may be achieved by leveraging a cache coherence protocol to send out invalidation signals to caches. It is noted that aborting updates with the redo log may be as simple as deleting the uncommitted redo log entries. The roll-forward operations of the redo log may be handled by the log accelerator 150 in the same way for the above-described background log replaying.

It is appreciated that the processor 110 is offloaded for logging operations, including undo log updates and redo log record replaying. The software interface for the log accelerator 150 may be relatively simple and intuitive. Moreover, the software interface may be relatively flexible in supporting various application requirements of memory updates. The transparent undo logging may be performed completely within memory, without contaminating the processor caches with non-reusable log blocks. The transparent undo logging may support quick query and rollback when a transaction aborts. Bandwidth pressure may be mitigated on the memory bus. Hardware and operating system modifications for the computer system may be relatively minimal, in accordance with example implementations. Log management systems and techniques disclosed herein may be relatively scalable and relatively easy to implement atop existing server and data center designs with commodity processor and memory architectures.

Other variations are contemplated and are within the scope of the appended claims. For example, as described above, the redo log records of a transaction are discarded after it commits. In accordance with further example implementations, the log accelerator 150 retains older redo log entries for another use: log shipping to a remote node for replication. In this manner, a remotely-disposed second node (a node other than a node formed by the computer system 100, for example) may maintain a somewhat delayed but consistent copy of the first node's data (the data stored on the computer system 100). By the first node shipping copies of the redo transaction information for committed transactions to the second node, the second node may atomically apply the effects of those transactions, enabling the second node to transition from one consistent state to another consistent state.

As a more specific example, in accordance with some implementations, the first node accumulates the redo log entries for one or multiple committed transactions and then sends the committed transaction(s)' log entries to the remote node. To do this, the redo transaction log may be organized as a ring buffer that is maintained by the log accelerator 150, with the current incomplete transaction (if any) occupying the end of the ring buffer. On an abort, the first node atomically removes the incomplete entries from the log (by moving a pointer, for example). On a commit, the first node applies the redo entries by copying their values into place locally (as described above) and also advances a pointer to make those redo entries part of the complete entries.

Thus, the local, first node accumulates the redo records for the transactions that committed rather than aborted in the ring buffer. Note that no extra memory bandwidth has been incurred in doing this, in accordance with example implementations. Software of the first node may query the hardware, determine the memory range containing the current redo log and then transmit the contents of that memory range to the remote, second node. In response to the second node acknowledging receiving the information and making it persistent, the software of the first node may then inform the log accelerator 150 that it can truncate the redo log, removing the contents of the sent memory range from the log (by moving a pointer, for example).

Because the ring buffer in practice has a finite size, in accordance with example implementations, there may be a provision to deal with the ring buffer filling up during a transaction. For example, an interrupt may be generated when the ring buffer is full or exceeds a certain capacity so that software may copy part of the redo log elsewhere before resuming or retrying the transaction. As another example, the amount of space remaining in the redo log ring buffer may be checked before the start of each transaction to make sure that the capacity of the ring buffer is sufficient.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   acquiring, by a log accelerator of an apparatus, a plurality of write requests from at least one memory controller of the apparatus;
   logging, by the log accelerator, information associated with the plurality of write requests in persistent storage of the apparatus; and
   applying, by the log accelerator, the plurality of write requests atomically as a group to the persistent storage.

2. The method of claim 1, further comprising generating the plurality of write requests by executing machine executable instructions by at least one processor, wherein the logging is performed transparently with respect to the operations of the at least one processor.

3. The method of claim 1, wherein the acquiring comprises probing a queue of the at least one memory controller.

4. The method of claim 1, further comprising:
   applying, by the log accelerator, the plurality of requests in response to a commit signal.

5. The method of claim 1, wherein acquiring the plurality of write requests comprises accumulating write requests associated with a memory region associated with an atomic unit.

6. The method of claim 1, wherein the logging comprises redo logging or undo logging.

7. An apparatus comprising:
   at least one processor to issue write requests;
   at least one memory controller to process the write requests;
   a log accelerator to:
      acquire the write requests;
      identify a plurality of the write requests as being commonly associated with an atomic unit;
      perform logging of information associated with the plurality of write requests; and
      apply the plurality of write requests atomically to commit the plurality of write requests to persistent storage.

8. The apparatus of claim 7, wherein the log accelerator performs the logging transparently with respect to the operations of the at least one processor.

9. The apparatus of claim 7, wherein the log accelerator applies the plurality of write requests atomically in a process that comprises writing and flushing at least one commit record to a non-volatile memory.

10. The apparatus of claim 7, wherein the log accelerator uses an associated logging memory space for the logging of the plurality of write requests and reuses the logging space after commitment of the plurality of write requests.

11. The apparatus of claim 7, wherein the log accelerator comprises hardware separate from the at least one memory controller.

12. The apparatus of claim 7, wherein:
   the at least one processor, the at least one memory controller and the log accelerator being associated with a first node;

the log accelerator further performs redo logging; and
the at least one processor further communicates data associated with the redo logging to a second node other than the first node to maintain a consistent state of the data on the second node.

13. A system comprising:
a persistent storage;
a processor to generate a plurality of write requests;
a log accelerator to acquire the write requests, and log information about the write requests in the persistent storage without intervention by the processor,
wherein the processor is to signal the log accelerator to apply the write requests atomically as a group to the persistent storage.

14. The system of claim 13, wherein the log accelerator is to log the write requests transparently with respect to operations of at the processor in generating the plurality of write requests.

15. The system of claim 13, further comprising a memory controller having a queue in which the write requests are stored upon generation by the processor,
wherein the log accelerator is to acquire the plurality of write requests by probing the queue.

16. The system of claim 13, wherein the log accelerator is further to apply the plurality of write requests in response to a commit signal.

17. The system of claim 13, wherein the log accelerator is to acquire the plurality of write requests by accumulating the write requests associated with a memory region associated with an atomic unit.

18. The system of claim 13, wherein the log accelerator is to log the information by redoing logging or undoing logging.

* * * * *